United States Patent
Tobari et al.

(10) Patent No.: US 7,528,568 B2
(45) Date of Patent: May 5, 2009

(54) VECTOR CONTROLLER FOR PERMANENT MAGNET SYNCHRONOUS MOTOR

(75) Inventors: Kazuaki Tobari, Hitachiota (JP); Tsunehiro Endo, Hitachiota (JP); Yoshiki Ito, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/502,437

(22) Filed: Aug. 11, 2006

(65) Prior Publication Data
US 2007/0035269 A1  Feb. 15, 2007

(30) Foreign Application Priority Data
Aug. 11, 2005  (JP) .............................. 2005-232727

(51) Int. Cl.
*H02P 6/00* (2006.01)
(52) U.S. Cl. .................. 318/723; 318/434; 318/139; 318/696
(58) Field of Classification Search ................ 318/254, 318/723, 434, 139, 696
See application file for complete search history.

(56) References Cited

U.S. PATENT DOCUMENTS

| | | | | |
|---|---|---|---|---|
| 5,594,670 A * | 1/1997 | Yamamoto | ................... | 702/64 |
| 6,456,030 B1 * | 9/2002 | Masaki et al. | ............... | 318/700 |
| 6,677,724 B1 * | 1/2004 | Kim et al. | .................... | 318/700 |
| 6,700,400 B2 * | 3/2004 | Atarashi | ..................... | 324/772 |
| 6,707,265 B2 * | 3/2004 | Imai et al. | ............. | 318/400.32 |
| 6,984,957 B2 * | 1/2006 | Tajima et al. | ............... | 318/700 |
| 7,039,542 B2 * | 5/2006 | Fujii et al. | .................. | 702/115 |

FOREIGN PATENT DOCUMENTS

JP          2001-145399          5/2001

* cited by examiner

*Primary Examiner*—Bentsu Ro
*Assistant Examiner*—David S Luo
(74) *Attorney, Agent, or Firm*—Antonelli, Terry, Stout & Kraus, LLP.

(57) ABSTRACT

A vector controller for a permanent magnet synchronous motor according to the present invention has a motor constant identifying unit for identifying motor constants of the permanent magnet synchronous motor, which is connected to an electric power converter in the vector controller, by using a second d-axis current command value, a second q-axis current command value, a detected output current of the electric power converter, and motor constant settings. The vector controller uses the motor constants identified by the motor constant identifying unit in vector control calculation so as to control the driving of the permanent magnet synchronous motor. Thereby, the vector controller achieves torque control with high accuracy and superior responsiveness.

14 Claims, 10 Drawing Sheets

WHEN low_mod_|v| = 1, CALCULATION FOR R IDENTIFICATION IS PERFORMED

WHEN High_mod_flg = 1, CALCULATION FOR Lq IDENTIFICATION IS PERFORMED

US 7,528,568 B2

VECTOR CONTROLLER FOR PERMANENT MAGNET SYNCHRONOUS MOTOR

CLAIM OF PRIORITY

The present application claims priority from Japanese application serial no. 2005-232727, filed on Aug. 11, 2005, the content of which is hereby incorporated by reference into this application.

FIELD OF THE INVENTION

The present invention relates to a vector controller for a permanent magnet synchronous motor and, more particularly, to a controller that motor constant identification immediately before or during an actual operation and automatically modifies motor constants set in a control system, thereby achieving torque control with high accuracy and superior responsiveness.

BACKGROUND OF THE INVENTION

A technology for identifying motor constants in a vector control method for a permanent magnet synchronous motor is disclosed in Japanese Patent Laid-Open No. 2001-145399. In the technology in said Patent Document, d-axis and q-axis voltages are detected by a detector attached to an electric power converter, and motor constants are identified by three processes described below.

(1) An induced voltage coefficient of the motor is identified from a difference between a voltage command value and the detected voltage value for the q-axis (torque) component in vector control.

(2) A motor resistance value is identified from a difference between a voltage command value and the detected voltage value for the d-axis (magnetic flux) component in vector control.

(3) If the motor resistance value identified in (2) above exceeds a limit value, a switchover occurs to an operation for identifying a q-axis inductance from the voltage difference of the d-axis component.

SUMMARY OF THE INVENTION

In the method described in Patent Document 1 above, a voltage detector specific to the electric power converter is required. Accuracy in identifying motor constants used for control is also lowered due to a voltage offset and the like. This may deteriorate control characteristics.

An object of the present invention is to provide a vector controller for a permanent magnet synchronous motor that achieves torque control with high accuracy and superior responsiveness without a detector and other means being added.

The inventive vector controller for a permanent magnet synchronous motor uses second current command values, which are intermediate values calculated from first current command values for the d-axis and q-axis and detected current values, as well as a frequency command value and motor constants to:

(1) in a low-speed area, identify a motor resistance value by using the second d-axis current command value or second q-axis current command value;

(2) in a high-speed area, control the d-axis current to 0 or a prescribed value other than 0, and identify an induced voltage coefficient and d-axis inductance value by using the second d-axis current command value;

(3) in a high-speed area, identify a q-axis inductance value by using the second q-axis command value if the q-axis current is greater than or equal to the prescribed value; and (4) automatically modify a control gain used to calculate voltage command values or second current command values by using the identified motor constants.

The inventive vector controller for a permanent magnet synchronous motor can achieve torque control with high accuracy and superior responsiveness.

DESCRIPTION OF THE PREFERRED EMBODIMENTS

Embodiments of the present invention will be described below in detail with reference to the drawings.

First Embodiment

Figure 1:
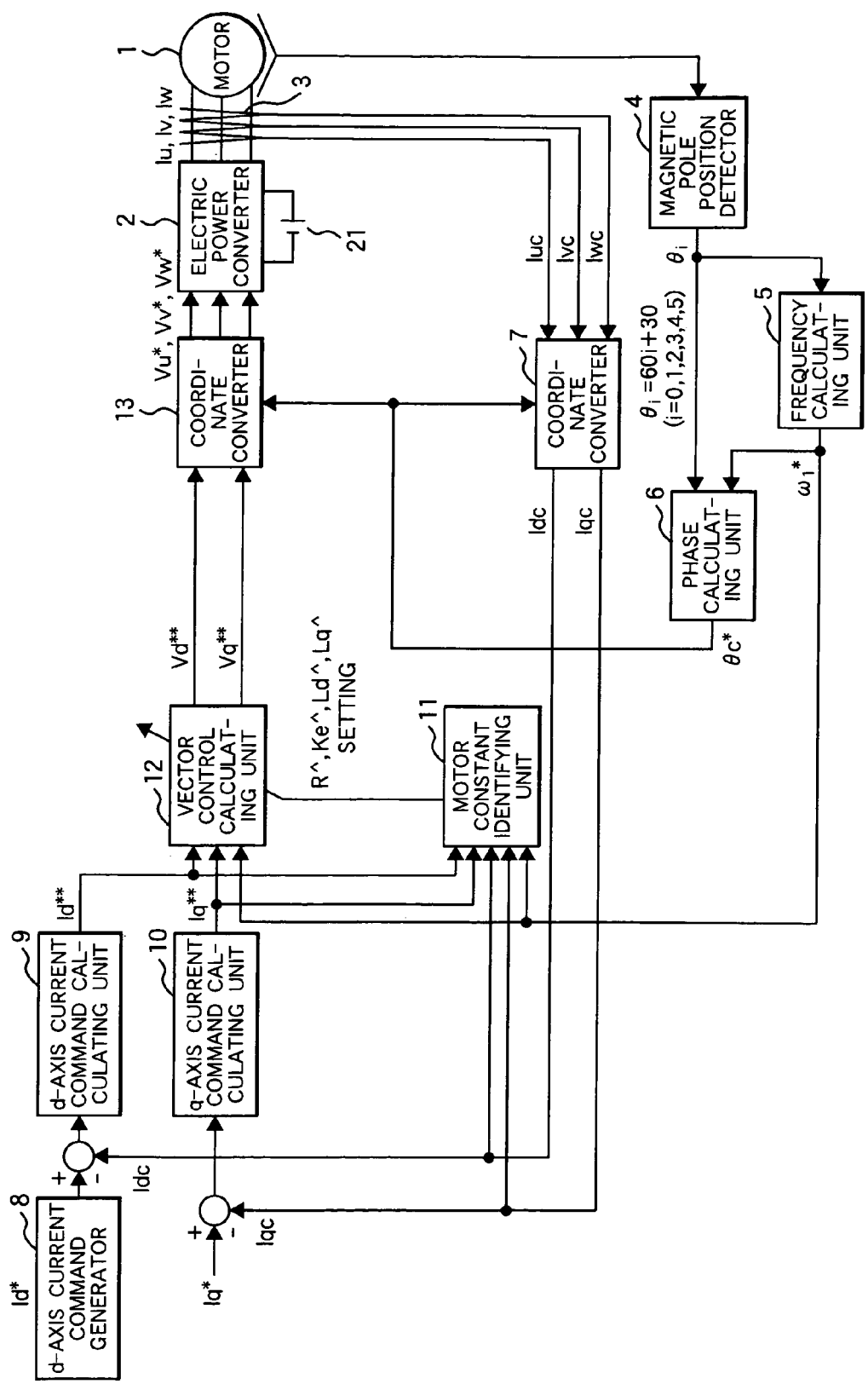
FIG. 1 shows the structure of a vector controller for a permanent magnet synchronous motor in a first embodiment.

FIG. 1 shows an exemplary structure of a vector controller for a permanent magnet synchronous motor according to a first embodiment. Reference numeral 1 indicates a permanent magnet synchronous motor. An electric power converter 2 outputs voltages that are in proportion to three-phase AC voltage command values Vu*, Vv*, and Vw*. Reference numeral 21 indicates a DC power supply. A current detector 3 detects three-phase AC currents Iu, Iv, and Iw. A magnetic pole position detector 4 detects a detected position value θi of the motor at every electrical angle of 60°. A frequency calculating unit 5 calculates a frequency command value ω1* from the detected position value θi. A phase calculating unit 6 calculates a rotational phase command value θc* of the motor from the detected position value θi and the frequency command value ω1*. A coordinate converter 7 outputs a detected d-axis current value Idc and a detected q-axis current value Iqc according to the detected three-phase AC current values Iuc, Ivc, and Iwc and the rotational phase command value θc*. A d-axis current command generator 8 sets a d-axis current command value Id*. A d-axis current command calculating unit 9 outputs a second d-axis current command value Id** according to a difference between a first d-axis current command value Id* given from a high-end unit and the detected d-axis current value Idc. A q-axis current command calculating unit 10 outputs a second q-axis current command value Iq** according to a difference between a first q-axis current command value Iq* given from the high-end unit and the detected q-axis current value Iqc. A motor constant identifying unit 11 calculates the identified value R^ of a resistance value, the identified value Ld^ of the d-axis inductance value, the identified value Lq^ of the q-axis inductance value, and the identified value Ke^ of the induced voltage coefficient according to the second d-axis current command value Id, the second q-axis current command value Iq, the detected d-axis current value Idc, the detected q-axis current value Iqc, and electrical constant settings of the permanent magnet synchronous motor. A vector control calculating unit 12 uses the second d-axis current command value Id, the second q-axis current command value Iq, the frequency command value ω1*, and motor constant settings (R*, Ld*, Lq*, and Ke*) to output a second d-axis voltage command value Vd and a second q-axis voltage command value Vq; the identified value R^ of the resistance, the identified value Ld^ of the d-axis inductance value, the identified value Lq^ of the q-axis inductance value, and the identified value Ke^ of the induced voltage coefficient, which are output from the motor constant identifying unit 11, may be used instead of the motor constant settings. A coordinate converter 13 outputs the three-phase AC voltage command values Vu*, Vv*, and Vw* according to the second d-axis voltage command value Vd, the second q-axis voltage command value Vq, and the rotational phase command value θc*.

First, a voltage and phase control method will be described. In the basic operation for voltage control, the d-axis current command calculating unit 9 and q-axis current command calculating unit 10 calculate the second d-axis current command value Id and second q-axis current command value Iq, which are intermediate value used for vector control calculation, by using the first d-axis current command value Id* and first q-axis current command value Iq*, which are given from the high-end unit, as well as the detected d-axis current value Idc and detected q-axis current value Iqc.

The vector control calculating unit 12 uses the second d-axis current command value Id, the second q-axis current command value Iq, the frequency command value ω1*, and motor constant settings to calculate the second d-axis voltage command value Vd and second q-axis voltage command value Vq shown in equation (1), and controls the three-phase AC voltage command values Vu*, Vv*, and Vw*.

$$\begin{bmatrix} Vd^{} \\ Vq^{} \end{bmatrix} = \begin{bmatrix} R^* & -\omega_1^* \cdot Lq^* \\ \omega_1^* \cdot Ld^* & R^* \end{bmatrix} \cdot \begin{bmatrix} Id^{} \\ Iq^{} \end{bmatrix} + \begin{bmatrix} 0 \\ \omega_1^* \cdot Ke^* \end{bmatrix} \quad (1)$$

In the above equation, R* is a resistance setting, Ld* is a d-axis inductance setting, Lq* is a q-axis inductance setting, and Ke* is an induced voltage coefficient setting.

For the basic operation in phase control, the magnetic pole position detector 4 can check a magnetic pole position at every electric angle of 60°. In this embodiment, the detected position value θi is represented as shown in equation (2).

$$\theta_i = 60i + 30 \quad (2)$$

In the above equation, i equals 0, 1, 2, 3, 4, and 5.

The frequency calculating unit 5 calculates a frequency command value ω1*, which is an average rotational speed in a shortest 60-degree period, from the detected position value θi according to equation (3).

$$\omega_1^* = \frac{\Delta\theta}{\Delta t} \quad (3)$$

In the above equation, axis error Δθ indicates θi−θ(i−1) and Δt is a time taken to detect a position detection signal in the 60° range.

The phase calculating unit 6 uses the detected position value θi and frequency command value ω1* to calculate the rotational phase command value θc* from equation (4) so that the reference phase of the permanent magnet synchronous motor 1 is controlled.

$$\theta c^*(i) = \theta(i-1) + \omega_1^* \cdot \Delta t \quad (4)$$

This completes the description of the basic operation in the voltage control and phase control by the vector controller for a permanent magnet synchronous motor.

Figure 2:
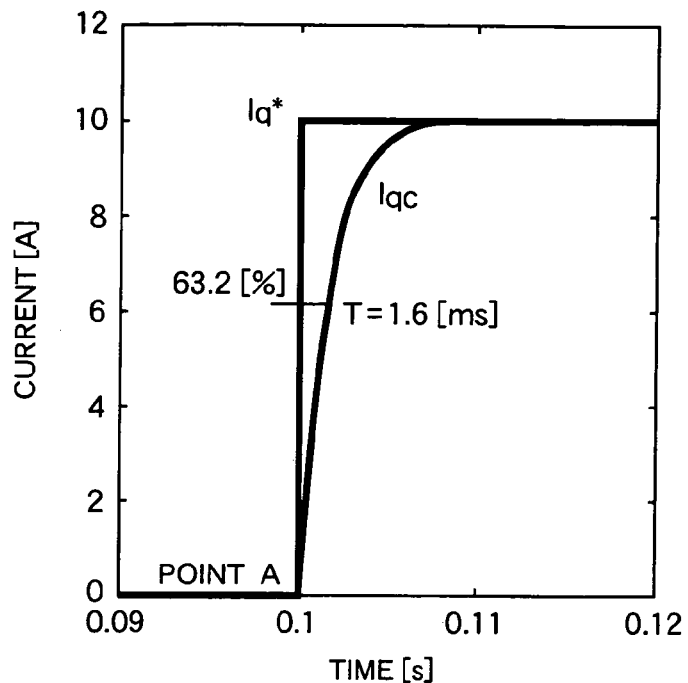
FIG. 2 illustrates current control characteristics when, in the first embodiment, the inductance value of the motor matches an inductance setting to be set for vector calculation.

Described below are control characteristics when the motor constant identifying unit 11 is not provided (the motor constant settings are R*, Ld*, Lq*, and Ke*) will be described. FIG. 2 shows current step response characteristics when the controller in FIG. 1 has no motor constant setting error, and FIG. 3 shows current step response characteristics when the controller has motor constant setting error.

In the characteristics in FIG. 2, the d-axis inductance value Ld and q-axis inductance value Lq of the permanent magnet synchronous motor 1 match the d-axis inductance setting Ld* and q-axis inductance setting Lq* to be set in the vector control calculating unit 12, respectively (Ld*=Ld and Lq*=Lq). When the motor is being operated at a fixed speed, if a step change is made for the first q-axis current command value Iq* at point A at which time is 0.1 second, as indicated by a dashed line, the detected q-axis current value Iqc follows immediately with a response time of 1.6 ms without causing an overshoot.

Figure 3:
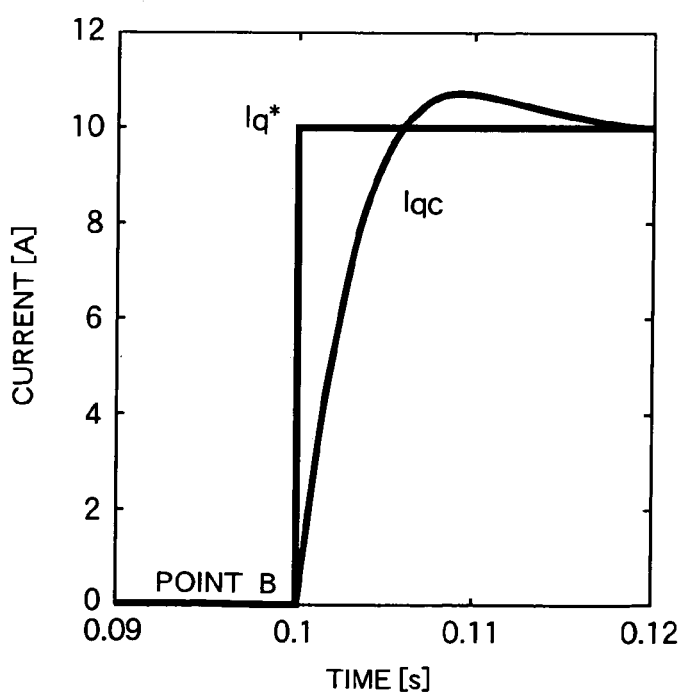
FIG. 3 illustrates current control characteristics when, in the first embodiment, the inductance value of the motor does not match an inductance setting to be set for vector calculation.

In FIG. 3 in which the d-axis inductance value Ld and q-axis inductance value Lq of the motor do not match the d-axis inductance setting Ld* and q-axis inductance setting Lq*, respectively (Ld*=0.5×Ld and Lq*=0.5×Lq), however, the characteristics of the detected q-axis current value Iqc to follow are deteriorated with respect to the first q-axis current command value Iq* and an overshoot also occurs. That is, if there is motor constant setting error, the characteristics to follow the current command value are deteriorated and an overshoot occurs, finally resulting in a long torque response and low torque accuracy.

Next, a principle to identify the motor constants will be described. The vector control calculating unit 12 calculates the second d-axis voltage command value Vd and second q-axis voltage command value Vq indicated in equation (1). In the description that follows, a character or characters marked an asterisk (*) is a setting. Voltages Vd and Vq applied to the motor are represented as shown in equation (5), by using motor currents Id and Iq and motor constants.

$$\begin{bmatrix} Vd \\ Vq \end{bmatrix} = \begin{bmatrix} R & -\omega_1 \cdot Lq \\ \omega_1 \cdot Ld & R \end{bmatrix} \cdot \begin{bmatrix} Id \\ Iq \end{bmatrix} + \begin{bmatrix} 0 \\ \omega_1 \cdot Ke \end{bmatrix} \quad (5)$$

In the above equation, $\omega_1$ is a frequency. If $\omega_1$ is assumed to be the frequency command value $\omega_1^*$ and the motor currents Id and Iq are also assumed to be the detected d-axis current value Idc and detected q-axis current value Iqc, the right side of equation (1) matches the right side of equation (5). Therefore, the second d-axis current command value Id, which is output from the d-axis current command calculating unit 9, and the second q-axis current command value Iq, which is output from the q-axis current command calculating unit 10, can be represented by equation (6).

$$\begin{bmatrix} Id^{} \\ Iq^{} \end{bmatrix} = \begin{bmatrix} \dfrac{(R \cdot R^* + \omega_1^2 \cdot Ld \cdot Lq^*) \cdot Idc + \omega_1 \cdot (R \cdot Lq^* - R \cdot Lq) \cdot Iqc + \omega_1^2 \cdot Lq^* \cdot (Ke - Ke^*)}{R^* + \omega_1^2 \cdot Ld^* \cdot Lq^*} \\ \dfrac{(R \cdot R^* + \omega_1^2 \cdot Ld^* \cdot Lq) \cdot Iqc + \omega_1 \cdot (R^* \cdot Ld - R \cdot Ld^*) \cdot Idc + \omega_1 \cdot r^* \cdot (Ke - Ke^*)}{R^{*2} + \omega_1^2 \cdot Ld^* \cdot Lq^*} \end{bmatrix} \quad (6)$$

Next, parameter sensitivity that appears in the second d-axis current command value Id and second q-axis current command value Iq in the low-speed area and high-speed area are considered. First, in the low-speed area, equation (7) holds.

$$R^{*2} \gg \omega_1^2 \cdot Ld^* \cdot Lq^* \quad (7)$$

When the frequency $\omega_1$ is noted, equation (7) is changed into equation (8).

$$\omega_1 \ll \dfrac{R^*}{\sqrt{Ld^* \cdot Lq^*}} \quad (8)$$

Then, approximation as shown in expression (9) is established from equation (6).

$$\begin{bmatrix} Id^{} \\ Iq^{} \end{bmatrix} \approx \quad (9)$$

$$\begin{bmatrix} \dfrac{(R \cdot R^*) \cdot Idc + \omega_1 \cdot (R \cdot Lq^* - R^* \cdot Lq) \cdot Iqc + \omega_1^2 \cdot Lq^* \cdot (Ke - Ke^*)}{R^{*2}} \\ \dfrac{(R \cdot R^*) \cdot Iqc + \omega_1 \cdot (R^* \cdot Ld - R \cdot Ld^*) \cdot Idc + \omega_1 \cdot r^* \cdot (Ke - Ke^*)}{R^{*2}} \end{bmatrix}$$

If the frequency $\omega_1$ approaches 0, equation (10) holds.

$$\begin{bmatrix} Id^{} \\ Iq^{} \end{bmatrix} \approx \begin{bmatrix} \dfrac{R}{R_*} \cdot Idc \\ \dfrac{R}{R_*} \cdot Iqc \end{bmatrix} \quad (10)$$

The resistance value R of the motor can be identified from equation (10) by using a second current command value (at least one of the second d-axis current command value Id and the second q-axis current command value Iq), the resistance setting R*, and a detected current value (at least one of the detected d-axis current value Idc and detected q-axis current value Iqc) or by using a first current command value (at least one of the first d-axis current command value Id* and the first q-axis current command value Iq*). The identified value R^ of the resistance is calculated from equations (11) and (12).

$$R^\wedge = \dfrac{Id^{**}}{Idc} \cdot R^* \quad (11)$$

-continued $$R^\wedge = \dfrac{Iq^{**}}{Iqc} \cdot R^* \quad (12)$$

That is, in the low-speed area, the resistance value R of the motor can be identified from a second current command value (at least one of the second d-axis current command value Id and the second q-axis current command value Iq). In the high-speed area, equation (14) holds from equation (13).

$$R^{*2} \ll \omega_1^2 \cdot Ld^* \cdot Lq^* \quad (13)$$

... (14)

Then, equation (6) is changed into equation (15).

$$\begin{bmatrix} Id^{} \\ Iq^{} \end{bmatrix} \approx \quad (15)$$

$$\begin{bmatrix} \dfrac{(\omega_1^2 \cdot Ld \cdot Lq^*) \cdot Idc + \omega_1 \cdot (R \cdot Lq^* - R^* \cdot Lq) \cdot Iqc + \omega_1^2 \cdot Lq^* \cdot (Ke - Ke^*)}{\omega_1^2 \cdot Ld^* \cdot Lq^*} \\ \dfrac{(\omega_1^2 \cdot Ld^* \cdot Lq) \cdot Iqc + \omega_1 \cdot (R^* \cdot Ld - R \cdot Ld^*) \cdot Idc + \omega_1 \cdot r^* \cdot (Ke - Ke^*)}{\omega_1^2 \cdot Ld^* \cdot Lq^*} \end{bmatrix}$$

Since $\omega_1$ is large ($\omega_1^2 \gg \omega_1$), equation (16) can be obtained.

$$\begin{bmatrix} Id^{} \\ Iq^{} \end{bmatrix} \approx \begin{bmatrix} \frac{Ld}{Ld^*} \cdot Idc + \frac{(Ke - Ke^*)}{Ld^*} \\ \frac{Lq}{Lq^*} \cdot Iqc \end{bmatrix} \quad (16)$$

It can be found from equation (16) that the induced voltage coefficient Ke and d-axis inductance value Ld can be identified from the second d-axis current command value Id and that the q-axis inductance value Lq can be identified from the second q-axis current command value Iq. First, the second d-axis current command value Id is focused. When the detected d-axis current value Idc is 0, the induced voltage coefficient Ke of the motor can be identified from the second d-axis current command value Id. The identified value Ke^ of the induced voltage coefficient Ke is calculated from equation (17).

$$Ke^\wedge = Id^{**} \cdot Ld + Ke^* \quad (17)$$

Then, current is caused to flow so that the detected d-axis current value Idc becomes a prescribed value. According to equation (18), the identified value Ld^ of the d-axis inductance value is calculated by using the second d-axis current command value Id** generated as the result of the current flow, the detected d-axis current value Idc (or the first d-axis current command value Id*), and a second d-axis current command value Id**$_0$ that is generated in the period in which the detected d-axis current value Idc is 0.

$$Ld^\wedge = \frac{Id^{} \cdot Id_0^{}}{Idc} \cdot Ld^* \quad (18)$$

Next, the second q-axis current command value Iq is focused. The q-axis inductance value Lq of the motor can be identified by using the second q-axis current command value Iq, the q-axis inductance setting Lq*, and the detected q-axis current value Iqc (or the first q-axis current command value Iq*). The identified value Lq^ of the q-axis inductance value is calculated from equation (19).

$$Lq^\wedge = \frac{Iq^{**}}{Idc} \cdot Lq^* \quad (19)$$

Figure 4:
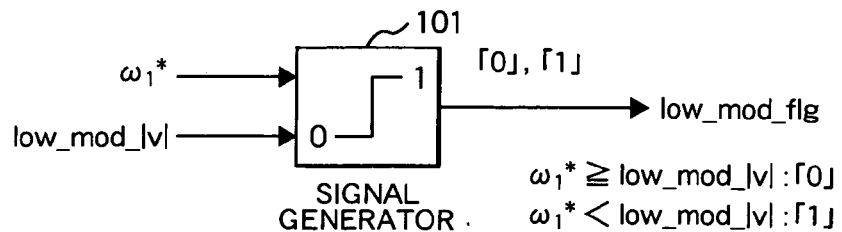
FIG. 4 illustrates how a signal generator 101 in a motor constant identifying unit 11 in the first embodiment operates.

This completes the description of the principle to identify the motor constants. Now, the structure of the motor constant identifying unit 11 of the present invention will be described with reference to FIGS. 4 and 5. First, calculation executed for the low-speed area to identify the resistance value R will be described with reference to FIG. 4. When a frequency command value ω1* is entered into a signal generator 101 that determines whether the area is a low-speed area, the signal generator 101 compares the frequency command value ω1* with a low-speed detection level low_mod_lvl and then creates a decision flag low_mod_flg according to equation (20).

$$\begin{pmatrix} \omega_1^* \geq \text{low\_mod\_lvl:} & \text{low\_mod\_fig} = 0 \\ \omega_1^* < \text{low\_mod\_lvl:} & \text{low\_mod\_fig} = 1 \end{pmatrix} \quad (20)$$

When the decision flag is 1, the area is determined to be a low-speed area, proceeding to calculation for identifying the resistance. The low-speed detection level must satisfy the relationship in equation (21).

$$\text{low\_mod\_lvl} << \frac{R^*}{\sqrt{Ld^* \cdot Lq^*}} \quad (21)$$

Figure 5:
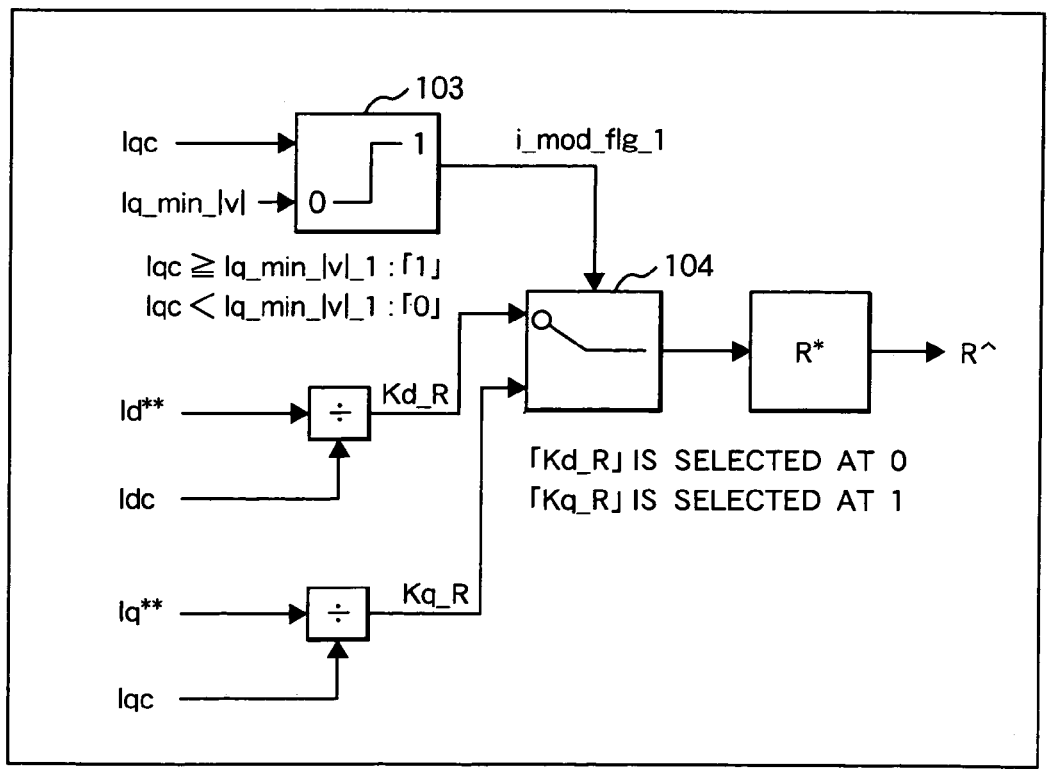
FIG. 5 illustrate how an identified value R^ of a resistance in a low-speed area is calculated in the motor constant identifying unit 11 in the first embodiment.

This identification will be described with reference to FIG. 5. The detected q-axis current value Iqc is entered into a deciding unit 103 and compared with a prescribed current level Iq_min_lvl_1. A decision flag i_mod_flg_1 is then created according to equation (22).

$$\begin{pmatrix} Iqc \geq \text{Iq\_min\_lvl\_1:} & \text{i\_mod\_flg\_1} = 1 \\ Iqc < \text{Iq\_min\_lvl\_2:} & \text{i\_mod\_flg\_1} = 0 \end{pmatrix} \quad (22)$$

The prescribed current level Iq_min_lvl_1 is a detected current level at which calculation for identification is possible. It suffices that the prescribed current level is from 1% to 10% of the rated current and preferably about from 3% to 6%. When the decision flag i_mod_flg_1 is 1, a ratio Kq_R of the second q-axis current command value Iq to the detected q-axis current value Iqc is output from a switching unit 104**. When the decision flag is 0, a prescribed value other than 0 is set as the first d-axis current command value Id* and current control is performed. A ratio Kd_R of the second d-axis current command value Id to the detected d-axis current value Idc is output from the switching unit 104**. The output ratio is multiplied by the resistance setting R* to calculate the identified value R^ of the resistance. Instead of the detected d-axis current value Idc, the first d-axis current command value Id* may be used to calculate the identified value R^ of the resistance in the same way. Similarly, instead of the detected q-axis current value Iqc, the first q-axis current command value Iq* may be used to calculate the identified value R^ of the resistance.

Figure 6:
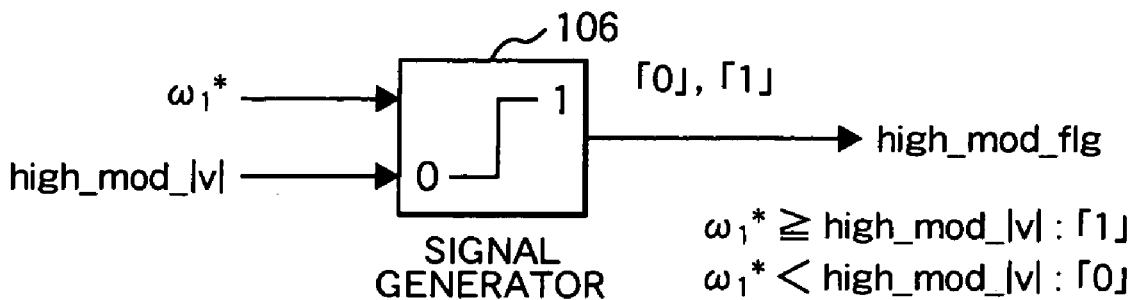
FIG. 6 illustrates how a signal generator 106 in the motor constant identifying unit 11 in the first embodiment operates.

Next, calculation executed for a high-speed area to identify the induced voltage coefficient Ke, d-axis inductance value Ld, and q-axis inductance value Lq will be described with reference to FIGS. 6 to 9. As shown in FIG. 6, when a frequency command value ω1* is entered into a signal generator 106 that determines whether the area is a high-speed area, the signal generator 106 compares the frequency command value ω1* with a high-speed detection level high_mod_lvl and then creates a decision flag high_mod_flg according to equation (23).

$$\begin{pmatrix} \omega_1^* \geq \text{low\_mod\_lvl:} & \text{low\_mod\_fig} = 1 \\ \omega_1^* < \text{low\_mod\_lvl:} & \text{low\_mod\_fig} = 0 \end{pmatrix} \quad (23)$$

When the decision flag is 1, the area is determined to be a high-speed area, proceeding to calculation for identifying the induced voltage coefficient and inductance value. The high-speed detection level must satisfy the relationship in equation (24).

$$\text{high\_mod\_lvl} \gg \frac{R^*}{\sqrt{Ld^* \cdot Lq^*}} \quad (24)$$

Figure 7:
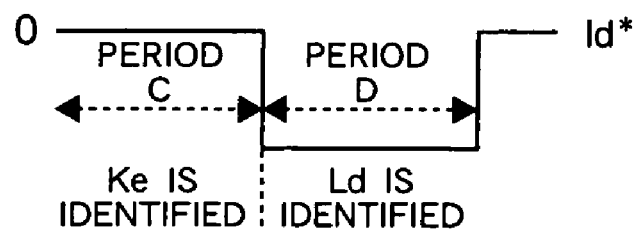
FIG. 7 shows a preset pattern of a first d-axis current command value Id* and operation in two identification periods in the motor constant identifying unit 11 in the first embodiment.

FIG. 7 shows the relationship between a preset pattern of the first d-axis current command value Id* and periods in which the induced voltage coefficient Ke and d-axis inductance value Ld are identified. When the first d-axis current command value Id* is 0, that is, in the period in which the detected d-axis current value Idc is 0 (period C), the induced voltage coefficient Ke is identified. The first d-axis current command value Id* is then set to a prescribed value other than 0 and the d-axis current Idc is controlled in the period D so as to identify the d-axis inductance value Ld.

Figure 8:
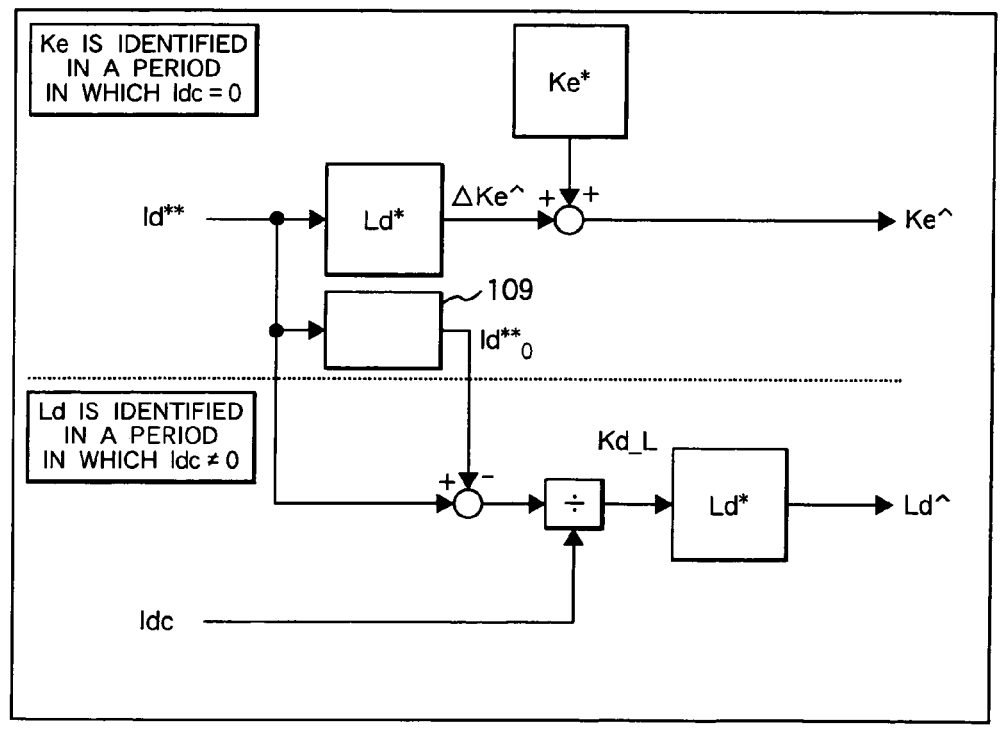
FIG. 8 illustrates how the identified value Ke^ of an induced voltage coefficient and the identified value Ld^ of a d-axis inductance value are calculated in the motor constant identifying unit 11 in the first embodiment.

This identification will be described with reference to FIG. 8. In the period in which the detected d-axis current value Idc is 0, the second d-axis current command value Id** is multiplied by the d-axis inductance setting Ld* and then the induced voltage coefficient setting Ke* is added to the multiplication result to calculate the identified value Ke^ of the induced voltage coefficient. In the period in which the detected d-axis current value Idc is a prescribed value other than 0, Id$_0$ is subtracted from the second d-axis current command value Id, Id$_0$ being an output signal from a means 109 for storing the second d-axis current command value Id that was generated in a period in which the detected d-axis current value Idc is 0. The ratio Kd_L of the subtraction result to the detected d-axis current value Idc is then multiplied by the d-axis inductance setting Ld* to calculate the identified value Ld^ of the d-axis inductance value.

Figure 9:
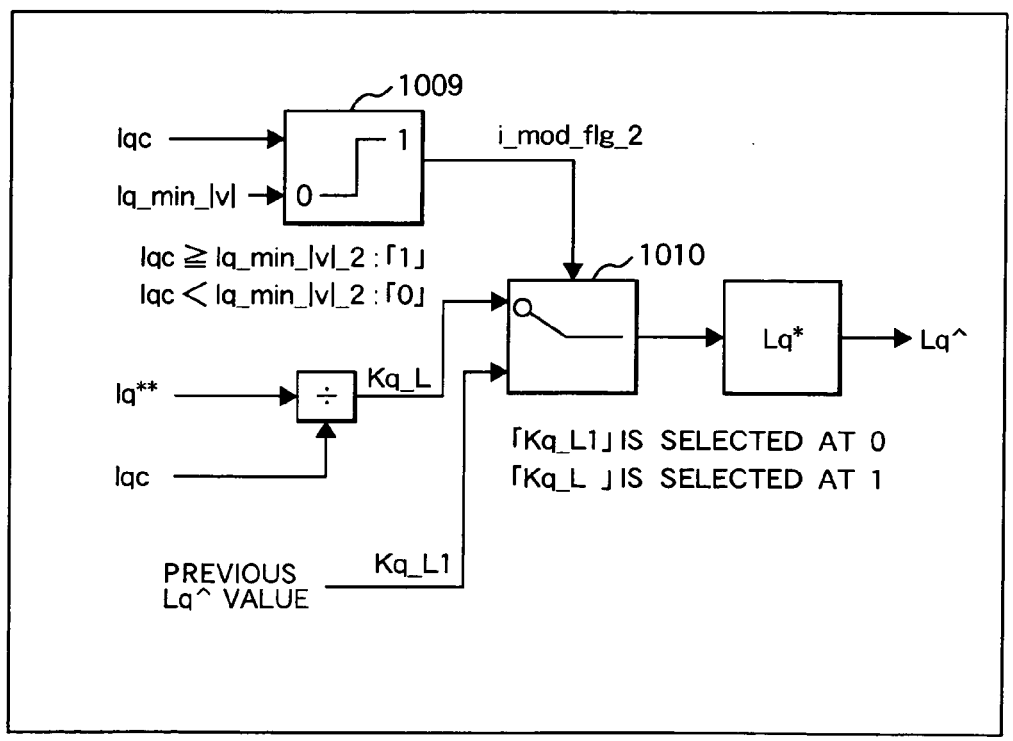
FIG. 9 illustrates how the identified value Lq^ of a q-axis inductance value is calculated in the motor constant identifying unit 11 in the first embodiment.

Next, calculation to identify the q-axis inductance value Lq by use of q-axis current information will be described with reference to FIG. 9. The detected q-axis current value Iqc is entered into a deciding unit 1009 and then compared with a prescribed current level Iq_min_lvl. A decision flag i_mod_flg_2 is created according to equation (25).

$$\begin{pmatrix} Iqc \geq \text{Iq\_min\_lvl\_2}: & \text{i\_mod\_fig\_2} = 1 \\ Iqc < \text{Iq\_min\_lvl\_2}: & \text{i\_mod\_fig\_2} = 0 \end{pmatrix} \quad (25)$$

The prescribed current level Iq_min_lvl_2 is a detected current level at which calculation for identification is possible. It suffices that the prescribed current level is from 1% to 10% of the rated current and preferably about from 3% to 6%. When the decision flag Iq_min_flgl_2 is 1, a ratio Kq_L of the second q-axis current command value Iq** to the detected q-axis current value Iqc is output from a switching unit 1010. When the decision flag Iq_min_flgl_2 is 0, the previously identified value Lq^ of the q-axis inductance value is output from the switching unit 1010, deciding that calculation for identification cannot be performed properly. The output value is multiplied by the q-axis inductance setting Lq* to calculate the identified value Lq^ of the q-axis inductance value.

The identified motor constants R^, Ke^, Ld^, and Lq^ are replaced by R*, Ke*, Ld*, and Lq*, which are settings in the vector control calculating unit 12, so as to create a torque control system. According to this embodiment, immediately before or during an actual operation, motor constant identification can be performed and motor constants set in the control system can be automatically modified, thereby achieving torque control with high accuracy and superior responsiveness.

Second Embodiment

Figure 10:
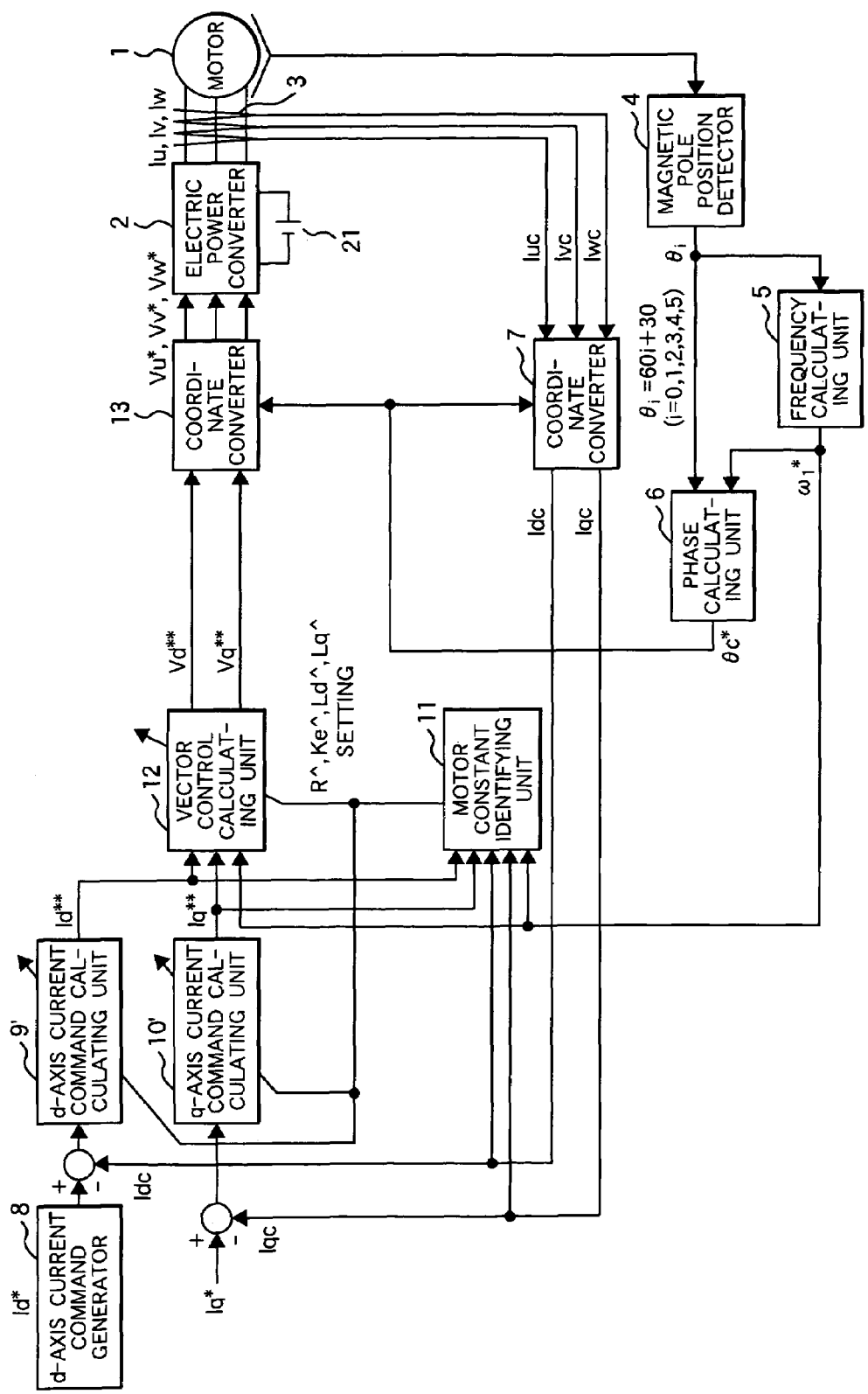
FIG. 10 shows the structure of a vector controller for a permanent magnet synchronous motor in a second embodiment.

FIG. 10 shows a second embodiment. This embodiment differs from the first embodiment in that the output values R^, Ld^, Lq^, and Ke^ of the motor constant identifying unit 11 are used to also apply control gains of a d-axis current command calculating unit 9' and q-axis current command calculating unit 10' to vector control calculation. Components with reference numerals 1 to 8, 11 to 13, and 21 in FIG. 10 are identical to their counterparts with the same reference numerals in FIG. 1. As shown in expression (26), the identified motor constants R^, Ld^, and Lq^ are used to modify control gains Kp_d, Ki_d, Kp_q, and Ki_q of the d-axis current command calculating unit 9' and q-axis current command calculating unit 10', achieving a torque control system with high accuracy and superior responsiveness as in the first embodiment.

$$\begin{pmatrix} Kp\_d = \omega_c\_\text{acr} \cdot \frac{Ld\,\wedge}{R\,\wedge}, & Ki\_d = \omega_0\_\text{acr} \\ Kp\_q = \omega_c\_\text{acr} \cdot \frac{Lq\,\wedge}{R\,\wedge}, & Ki\_q = \omega_c\_\text{acr} \end{pmatrix} \quad (26)$$

In the above equation, Kp_d is a proportional gain used to calculate the second d-axis current command value, Ki_d is an integration gain, Kp_q is a proportional gain used to calculate the second q-axis current command value, Ki_q is an integration gain, and ωc_arc is a current control response angular frequency (rad/s).

Third Embodiment

Figure 11:
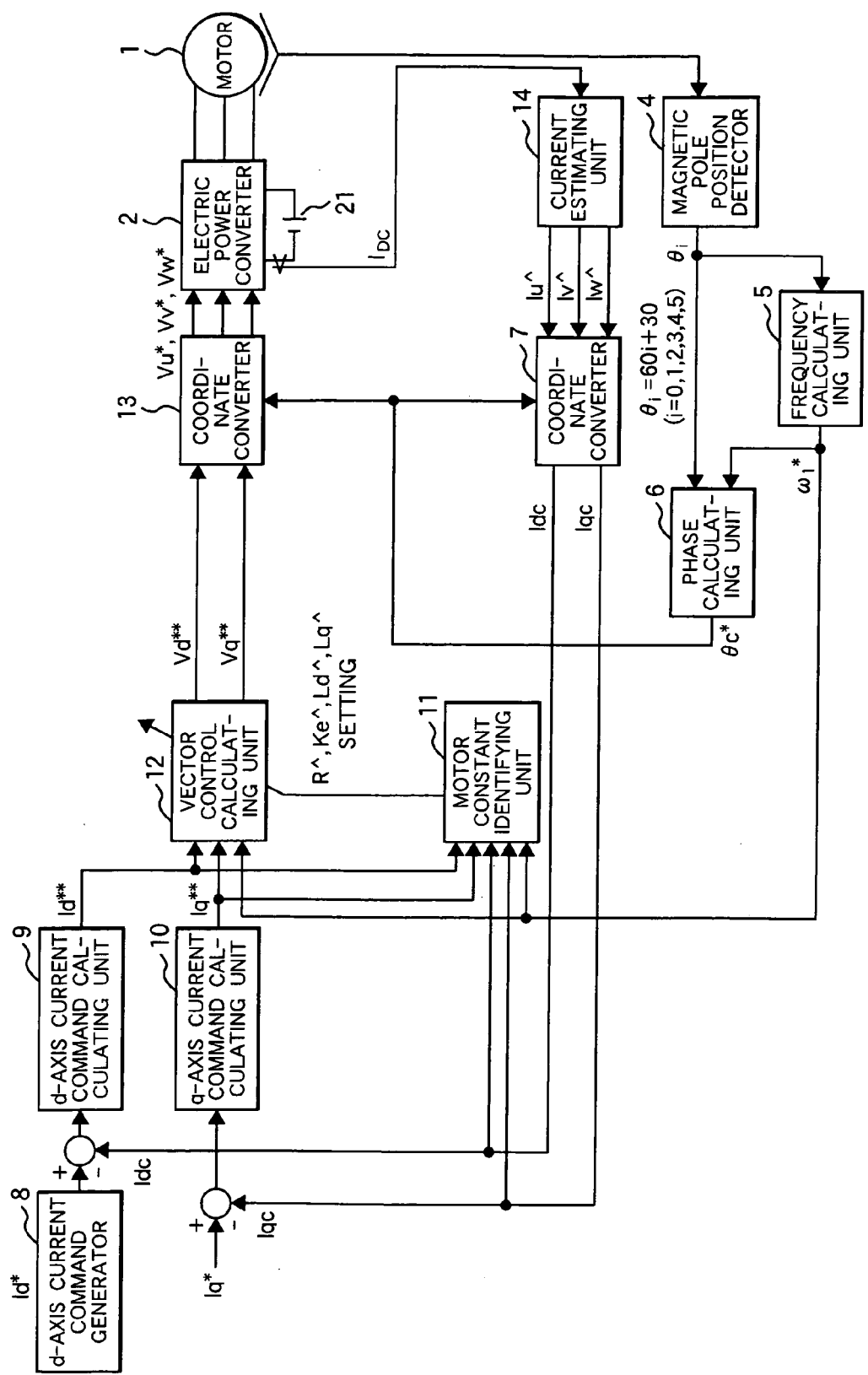
FIG. 11 shows the structure of a vector controller for a permanent magnet synchronous motor in a third embodiment.

FIG. 11 shows a third embodiment. This embodiment differs from the first embodiment in that the current detector 3 is not provided, but a current estimating unit 14 is provided that estimates three-phase AC currents Iu, Iv, and Iw that are output from the electric power converter 2 and flow into the permanent magnet synchronous motor 1, according to DC current $I_{DC}$ that flows in an input bus of the electric power converter 2.

Components with reference numerals 1, 2, 4 to 12, and 21 in FIG. 11 are identical to their counterparts with the same reference numerals in FIG. 1. The current estimating unit 14 estimates three-phase AC currents Iu, Iv, and Iw that flow into the permanent magnet synchronous motor 1, according to DC current $I_{DC}$ that flows in the input bus of the electric power converter.

Estimated current values Iu^, Iv^, and Iw^ output by the current estimating unit 14 are used by the coordinate converter 7 to calculate the detected d-axis current value Idc and detected q-axis current value Iqc. Even a current sensorless system in this embodiment can operate as in the first and second embodiments, providing the same effect.

Fourth Embodiment

Figure 12:
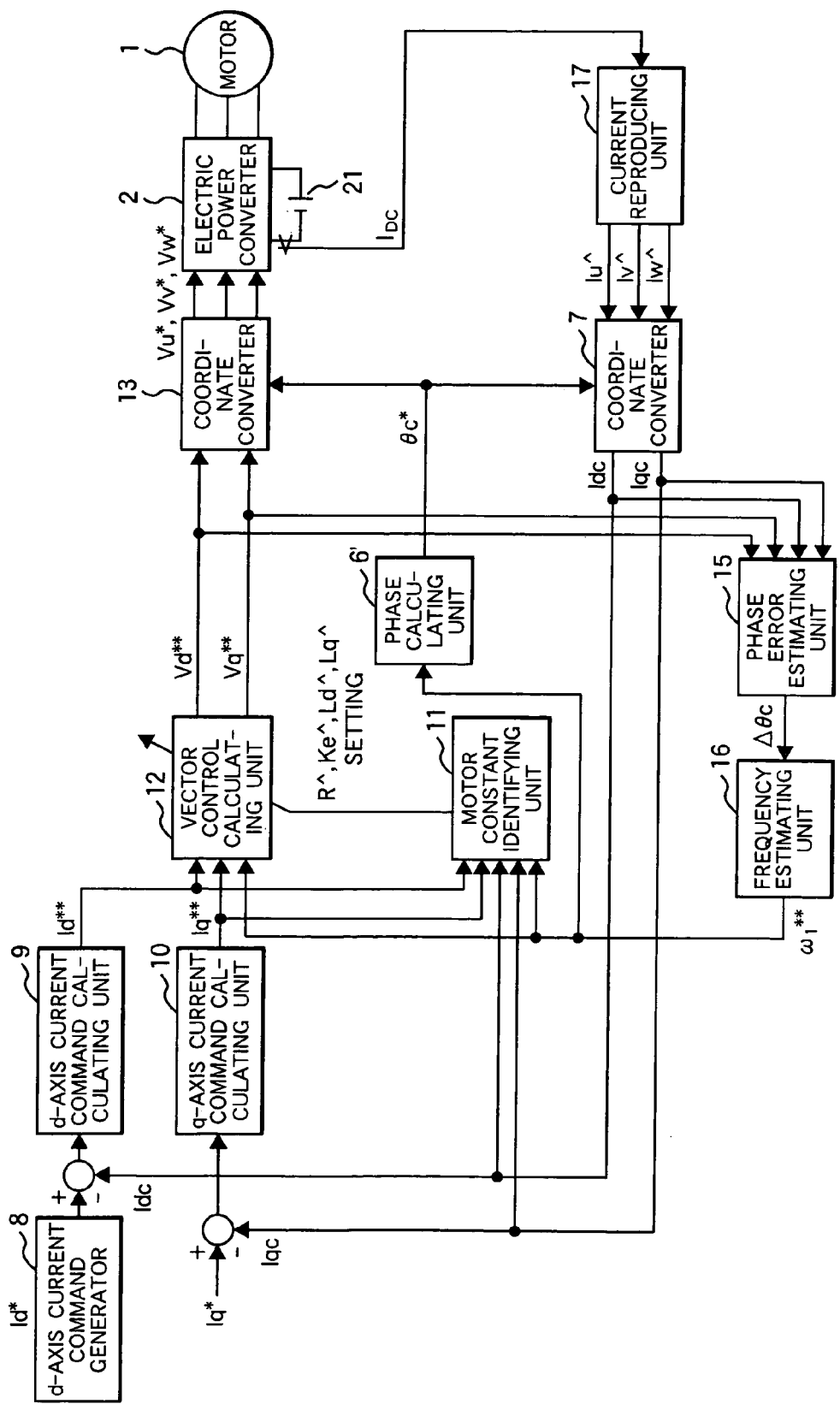
FIG. 12 shows the structure of a vector controller for a permanent magnet synchronous motor in a fourth embodiment.

FIG. 12 shows a fourth embodiment. This embodiment differs from the first embodiment in that the magnetic pole position detector 4, which detects a magnetic pole position of the permanent magnet synchronous motor 1, is not provided. Components with reference numerals 1, 2, 4 to 13, and 21 in FIG. 12 are identical to their counterparts with the same reference numerals in FIG. 1. A current reproducing unit 17 estimates three-phase AC currents Iu, Iv, and Iw that flow into the permanent magnet synchronous motor 1, according to DC current $I_{DC}$ that flows in the input bus of the electric power converter. A phase error estimating unit 15 uses the second d-axis voltage command value Vd, second q-axis voltage command value Vq, detected d-axis current value Idc, and detected q-axis current value Iqc to estimate, by calculation based on equation (27), axial error $\Delta\theta$ (=$\theta c^*-\theta$) between the rotational phase command value $\theta c^*$ and the magnetic flux axis $\theta$ of the motor, and outputs a phase error calculation $\Delta\theta c$.

$$\Delta\theta c = -\tan^{-1}\left[\frac{Vd^{**} - R^* \cdot Idc - \omega_1^* \cdot Lq^* \cdot Iqc}{Vq^{**} - R^* \cdot Iqc + \omega_1^* \cdot Lq^* \cdot Idc}\right] \quad (27)$$

A frequency estimating unit 16 estimates a new frequency command value $\omega 1^*$ so that the phase error calculation $\Delta\theta c$, which is estimated by calculation, becomes 0. Even the position sensorless, current sensorless system in this embodiment can operate as in the first and second embodiments, providing the same effect.

Fifth Embodiment

Figure 13:
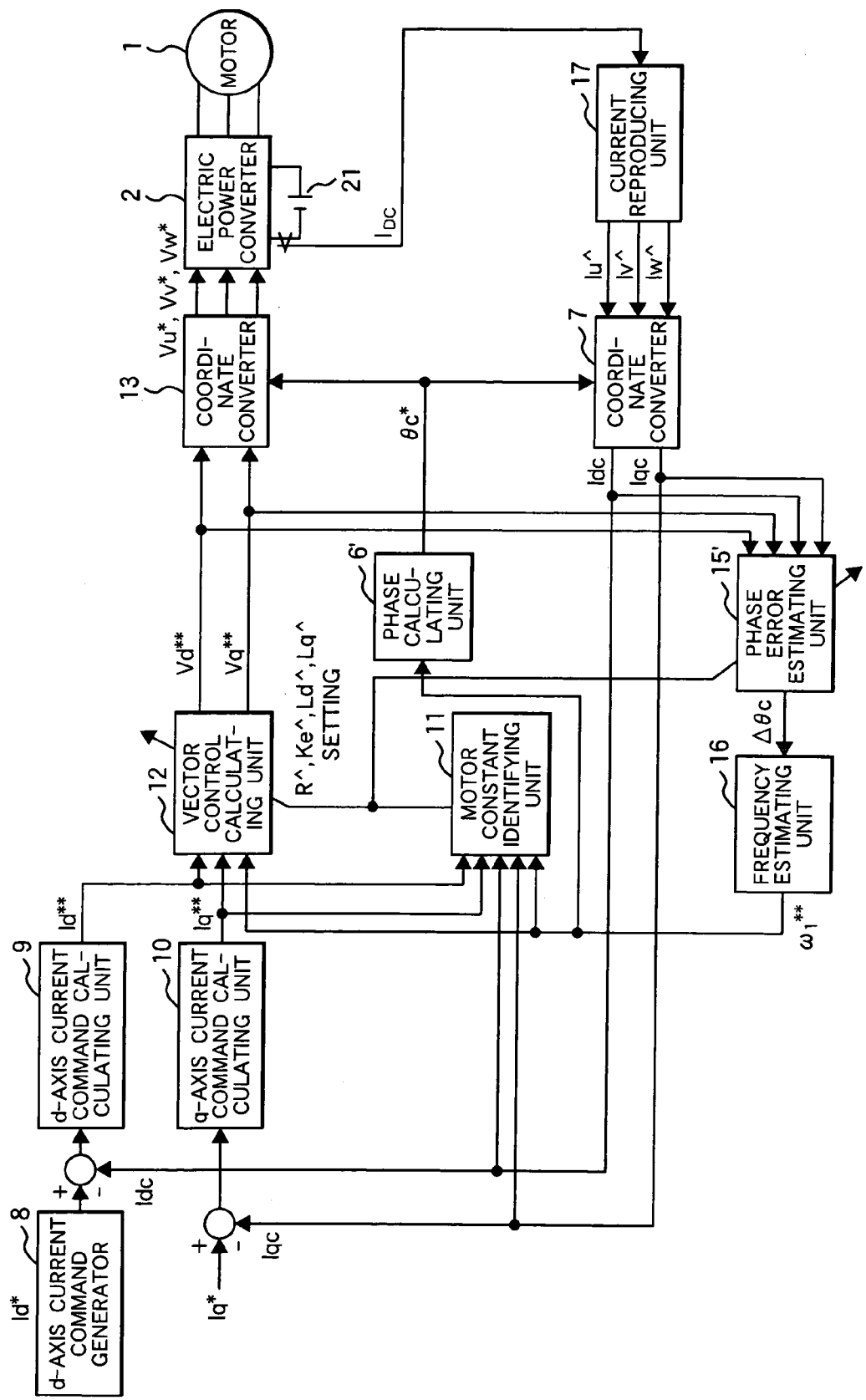
FIG. 13 shows the structure of a vector controller for a permanent magnet synchronous motor in a fifth embodiment.

FIG. 13 shows a fifth embodiment. In this embodiment, the motor constants for the phase error estimating unit 15 in the fourth embodiment are automatically modified by using the output values R^ and Lq^ from the motor constant identifying unit 11. Components with reference numerals 1, 2, 4 to 13, 16, and 21 in FIG. 13 are identical to their counterparts with the same reference numerals in FIG. 4. A phase error estimating unit 15' uses the second d-axis voltage command value Vd, second q-axis voltage command value Vq, detected d-axis current value Idc, detected q-axis current value Iqc, and the output values R^ and Lq^ from the motor constant identifying unit 11 to estimate, by calculation based on equation (28), axial error $\Delta\theta(=\theta c^*-\theta)$ between the rotational phase command value $\theta c^*$ and the magnetic flux axis $\theta$ of the motor, and outputs a phase error calculation $\Delta\theta c'$.

$$\Delta\theta c = -\tan^{-1}\left[\frac{Vd^{**} - R\wedge \cdot Idc - \omega_1^* \cdot Lq\wedge \cdot Iqc}{Vq^{**} - R\wedge \cdot Iqc + \omega_1^* \cdot Lq\wedge \cdot Idc}\right] \quad (28)$$

Even the position sensorless, current sensorless system in this embodiment can operate as in the first and second embodiments, providing the same effect.

What is claimed is:

1. The vector controller for a permanent magnet synchronous motor comprising:
   an electric power converter for driving the permanent magnet synchronous motor;
   a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;
   a motor constant identifying unit for identifying motor constants of the permanent magnet synchronous motor, by using the second d-axis current command value, the second q-axis current command value, a detected output current of the electric power converter, and the motor constant settings;
   wherein the vector control calculating unit uses the motor constants identified by the motor constant identifying unit in the vector control calculation of the vector control calculating unit so as to control driving of the permanent magnet synchronous motor;
   wherein, in a low-speed area in which the frequency command value is smaller than a value determined in advance, the motor constant identifying unit sets the first d-axis current command value to a prescribed value other than 0, and then multiplies a ratio of the second d-axis current command value to the detected d-axis current value by a resistance setting, which is one of the motor constant settings, so as to identify a resistance value of the motor.

2. The vector controller for a permanent magnet synchronous motor comprising:
   an electric power converter for driving the permanent magnet synchronous motor;
   a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;
   a motor constant identifying unit for identifying motor constants of the permanent magnet synchronous motor, by using the second d-axis current command value, the second q-axis current command value, a detected output current of the electric power converter, and the motor constant settings;
   wherein the vector control calculating unit uses the motor constants identified by the motor constant identifying unit in the vector control calculation of the vector control calculating unit so as to control driving of the permanent magnet synchronous motor;
   wherein, in a low-speed area in which the frequency command value is smaller than a value determined in advance, the motor constant identifying unit sets the first d-axis current command value to a prescribed value other than 0, and then multiplies a ratio of the second d-axis current command value to the first d-axis current command value by a resistance setting, which is one of the motor constant settings, so as to identify a resistance value of the motor.

3. The vector controller for a permanent magnet synchronous motor comprising:
   an electric power converter for driving the permanent magnet synchronous motor;
   a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a motor constant identifying unit for identifying motor constants of the permanent magnet synchronous motor, by using the second d-axis current command value, the second q-axis current command value, a detected output current of the electric power converter, and the motor constant settings;

wherein the vector control calculating unit uses the motor constants identified by the motor constant identifying unit in the vector control calculation of the vector control calculating unit so as to control driving of the permanent magnet synchronous motor;

wherein, in a low-speed area in which the frequency command value is smaller than a value determined in advance, the motor constant identifying unit multiplies a ratio of the second q-axis current command value to a detected q-axis current value by a resistance setting, which is one of the motor constant settings, so as to identify a resistance value of the motor.

4. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a motor constant identifying unit for identifying motor constants of the permanent magnet synchronous motor, by using the second d-axis current command value, the second q-axis current command value, a detected output current of the electric power converter, and the motor constant settings;

wherein the vector control calculating unit uses the motor constants identified b the motor constant identifying unit in the vector control calculation of the vector control calculating unit so as to control driving of the permanent magnet synchronous motor;

wherein, in a low-speed area in which the frequency command value is smaller than a value determined in advance, the motor constant identifying unit multiplies a ratio of the second q-axis current command value to the first q-axis current command value by a resistance setting, which is one of the motor constant settings, so as to identify a resistance value of the motor.

5. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a motor constant identifying unit for identifying motor constants of the permanent magnet synchronous motor, by using the second d-axis current command value the second q-axis current command value, a detected output current of the electric power converter, and the motor constant settings;

wherein the vector control calculating unit uses the motor constants identified by the motor constant identifying unit in the vector control calculation of the vector control calculating unit so as to control driving of the permanent magnet synchronous motor;

wherein, in a low-speed area in which the frequency command value is smaller than a value determined in advance:

if the first d-axis current command value is smaller than or equal to a first prescribed value, the motor constant identifying unit sets the first d-axis current command value to a second prescribed value other than 0 and then multiplies a ratio of the second d-axis current command value to the detected d-axis current value by a resistance setting, which is one of the motor constant settings, so as to identify a resistance value of the motor; and if the first d-axis current command value is greater than the first prescribed value, the motor constant identifying unit sets the first d-axis current command value to 0 and then multiplies the ratio of the second q-axis current command value to the detected q-axis current value by the resistance setting, which is one of the motor constant settings, so as to identify a resistance value of the motor.

6. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a motor constant identifying unit for identifying motor constants of the permanent magnet synchronous motor, by using the second d-axis current command value, the second q-axis current command value, a detected output current of the electric power converter, and the motor constant settings;

wherein the vector control calculating unit uses the motor constants identified by the motor constant identifying unit in the vector control calculation of the vector control calculating unit so as to control driving of the permanent magnet synchronous motor;

wherein, in a high-speed area in which the frequency command value is greater than a value determined in advance:

the motor constant identifying unit identifies an induced voltage coefficient of the motor by using the second d-axis current command value as well as a d-axis inductance setting and an induced voltage coefficient setting, which are two of the motor constant settings; and the motor constant identifying unit identifies a d-axis inductance of the motor by using the second d-axis current command value, the detected d-axis current value, and the d-axis inductance setting, which is one of the motor constant settings.

7. The vector controller according to claim 6, wherein the motor constant identifying unit identifies the induced voltage coefficient of the motor in a first period in which the first d-axis current command value in the high-speed area is 0, and also identifies the d-axis inductance of the motor in a second period in which the first d-axis current command value in the high-speed area is a prescribed value other than 0.

8. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a motor constant identifying unit for identifying motor constants of the permanent magnet synchronous motor, by using the second d-axis current command value, the second q-axis current command value, a detected output current of the electric power converter, and the motor constant settings;

wherein the vector control calculating unit uses the motor constants identified by the motor constant identifying unit in the vector control calculation of the vector control calculating unit so as to control driving of the permanent magnet synchronous motor;

wherein, in a high-speed area in which the frequency command value is greater than a value determined in advance;

the motor constant identifying unit identifies a q-axis inductance of the motor by using the second q-axis current command value, a detected q-axis current value, and a q-axis inductance setting, which is one of the motor constant settings.

9. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a current estimating unit for estimating an output current of the electric power converter from an input DC current of the electric power converter; and a motor constant identifying unit for identifying motor constants of the permanent magnet synchronous motor, by using the second d-axis current command value, the second q-axis current command value, the estimated output current of the electric power converter, and the motor constant settings;

wherein the vector control calculating unit uses the motor constants identified by the motor constant identifying unit in the vector control calculation of the vector control calculating unit so as to control driving of the permanent magnet synchronous motor;

wherein, in a low-speed area in which the frequency command value is smaller than a value determined in advance, the motor constant identifying unit sets the first d-axis current command value to a prescribed value other than 0, and then multiplies a ratio of the second d-axis current command value to an estimated d-axis current value by a resistance setting, which is one of the motor constant settings, so as to identify a resistance value of the motor.

10. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and d motor constant settings;

a current estimating unit for estimating an output current of the electric power converter from an input DC current of the electric power converter; and a motor constant identifying unit for identifying motor constants of the permanent magnet synchronous motor, by using the second d-axis current command value, the second q-axis current command value, the estimated output current of the electric power converter, and the motor constant settings;

wherein the vector control calculating unit uses the motor constants identified by the motor constant identifying unit in the vector control calculation of the vector control calculating unit so as to control driving of the permanent magnet synchronous motor;

wherein, in a high-speed area in which the frequency command value is greater than a value determined in advance:

the motor constant identifying unit identifies an induced voltage coefficient of the motor by using the second d-axis current command value as well as a d-axis inductance setting and an induced voltage coefficient setting, which are two of the motor constant settings; and the motor constant identifying unit identifies a d-axis inductance of the motor by using the second d-axis current command value, an estimated d-axis current value, and a d-axis inductance setting, which is one of the motor constant settings.

11. The vector controller for a permanent magnet synchronous motor comprising:

an electric power converter for driving the permanent magnet synchronous motor;

a vector control calculating unit which calculates control vectors for controlling a d-axis voltage command and a g-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a current estimating unit for estimating an output current of the electric power converter from an input DC current of the electric power converter; and a motor constant identifying unit for identifying motor constants of the permanent magnet synchronous motor, by using the second d-axis current command value, the second q-axis current command value, the estimated output current of the electric power converter, and the motor constant settings;

wherein the vector control calculating unit uses the motor constants identified by the motor constant identifying unit in the vector control calculation of the vector control calculating unit so as to control driving of the permanent magnet synchronous motor;

wherein, in a high-speed area in which the frequency command value is greater than a value determined in advance, the motor constant identifying unit identifies a q-axis inductance of the motor by using the second q-axis current command value, an estimated q-axis current value, and a q-axis inductance setting, which is one of the motor constant settings.

12. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a current reproducing unit for estimating an output current of the electric power converter from an input DC current of the electric power converter;

a phase error estimating unit for calculating axial error by using the estimated output current of the electric power converter, the second d-axis current command value, and the second q-axis current command value;

a frequency estimating unit for accepting the axial error output by the phase error estimating unit and outputting an estimated frequency command value; and a motor constant identifying unit for identifying motor constants of the permanent magnet synchronous motor, by using the second d-axis current command value the second q-axis current command value, the estimated output current of the electric power converter, and the motor constant settings;

wherein the vector control calculating unit uses the motor constants identified by the motor constant identifying unit in the vector control calculation of the vector control calculating unit so as to control the driving of the permanent magnet synchronous motor;

wherein, in a low-speed area in which the estimated frequency command value is smaller than a value determined in advance;

the motor constant identifying unit sets the first d-axis current command value to a prescribed value other than 0, and then multiplies a ratio of the second d-axis current command value to an estimated d-axis current value by a resistance setting, which is one of the motor constant settings, so as to identify a resistance value of the motor.

13. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a current reproducing unit for estimating an output current of the electric power converter from an input DC current of the electric power converter;

a phase error estimating unit for calculating axial error by using the estimated output current of the electric power converter, the second d-axis current command value, and the second q-axis current command value;

a frequency estimating unit for accepting the axial error output by the phase error estimating unit and outputting an estimated frequency command value; and a motor constant identifying unit for identifying motor constants of the permanent magnet synchronous motor, by using the second d-axis current command value the second q-axis current command value, the estimated output current of the electric power converter, and the motor constant settings;

wherein the vector control calculating unit uses the motor constants identified by the motor constant identifying unit in the vector control calculation of the vector control calculating unit so as to control the driving of the permanent magnet synchronous motor;

wherein, in a high-speed area in which the estimated frequency command value is greater than a value determined in advance:

the motor constant identifying unit identifies an induced voltage coefficient of the motor by using the second d-axis current command value as well as a d-axis inductance setting and an induced voltage coefficient setting, which are two of the motor constant settings; and the motor constant identifying unit identifies a d-axis inductance of the motor by using the second d-axis current command value, an estimated d-axis current value, and a d-axis inductance setting, which is one of the motor constant settings.

14. The vector controller for a permanent magnet synchronous motor comprising:

an electric power converter for driving the permanent magnet synchronous motor;

a vector control calculating unit which calculates control vectors for controlling a d-axis voltage command and a q-axis voltage command based on (a) a second d-axis current command value, which is calculated from a difference between a first d-axis current command value and a detected d-axis current value, (b) a second q-axis current command value which is calculated from a difference between a first q-axis current command value and a detected d-axis current value, (c) a frequency command value, and (d) motor constant settings;

a current reproducing unit for estimating an output current of the electric power converter from an input DC current of the electric power converter;

a phase error estimating unit for calculating axial error by using the estimated output current of the electric power converter, the second d-axis current command value, and the second q-axis current command value;

a frequency estimating unit for accepting the axial error output by the phase error estimating unit and outputting an estimated frequency command value; and a motor constant identifying unit for identifying motor constants of the permanent magnet synchronous motor by using the second d-axis current command value the second q-axis current command value, the estimated output current of the electric power converter, and the motor constant settings;

wherein the vector control calculating unit uses the motor constants identified by the motor constant identifying unit in the vector control calculation of the vector control calculating unit so as to control the driving of the permanent magnet synchronous motor;

wherein, in a high-speed area in which the estimated frequency command value is greater than a value determined in advance;

the motor constant identifying unit identifies a q-axis inductance of the motor by using the second q-axis current command value, an estimated q-axis current value, and a q-axis inductance setting, which is one of the motor constant settings.

* * * * *